United States Patent
Hsu

(10) Patent No.: US 7,290,935 B2
(45) Date of Patent: Nov. 6, 2007

(54) BEARING ASSEMBLY WITH BEARING SLEEVE HAVING END BEARING MEMBERS

(75) Inventor: Mu Chi Hsu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 538 days.

(21) Appl. No.: 10/680,019

(22) Filed: Oct. 6, 2003

(65) Prior Publication Data

US 2004/0114841 A1 Jun. 17, 2004

(30) Foreign Application Priority Data

Dec. 13, 2002 (TW) .............................. 91220206 U

(51) Int. Cl.
*F16C 17/00* (2006.01)
(52) U.S. Cl. ..................... 384/276; 384/282
(58) Field of Classification Search ............... 384/276, 384/282, 283, 284, 289, 297
See application file for complete search history.

(56) References Cited

U.S. PATENT DOCUMENTS

| | | | | |
|---|---|---|---|---|
| 1,189,905 A | * | 7/1916 | Bache | 384/283 |
| 1,194,463 A | * | 8/1916 | Bache | 384/283 |
| 1,398,220 A | * | 11/1921 | Acheson, Jr. | 384/283 |
| 1,581,394 A | * | 4/1926 | Dann | 384/284 |
| 1,637,317 A | * | 7/1927 | Shoemaker | 384/284 |
| 4,334,688 A | * | 6/1982 | Spargo et al. | 277/422 |
| 5,697,206 A | * | 12/1997 | Otani et al. | 59/4 |
| 6,439,774 B1 | * | 8/2002 | Knepper et al. | 384/110 |
| 6,457,867 B1 | * | 10/2002 | Rogers | 384/113 |

FOREIGN PATENT DOCUMENTS

| JP | 59-155621 | * | 9/1984 |
|---|---|---|---|
| TW | 495118 | | 7/2002 |

* cited by examiner

*Primary Examiner*—William C. Joyce
(74) *Attorney, Agent, or Firm*—Wei Te Chung

(57) ABSTRACT

A ceramic bearing assembly includes a shaft (20), and a bearing sleeve (10) rotatably receiving the shaft. The bearing sleeve includes an inside wall. First and second bearing blocks (120, 140) are formed at the inside wall at first and second ends of the bearing sleeve respectively. The first bearing blocks are arranged in circular fashion, and the second bearing blocks are arranged in circular fashion complementarily offset from the first bearing blocks. Each of the first and second bearing members defines a concave bearing surface (122, 142), the bearing surfaces cooperatively supporting the shaft therebetween.

18 Claims, 3 Drawing Sheets

BEARING ASSEMBLY WITH BEARING SLEEVE HAVING END BEARING MEMBERS

BACKGROUND OF THE INVENTION

1. Field of the Invention

The present invention relates generally to bearings, and more particularly to a sliding ceramic bearing which can be readily produced.

2. Prior Art

Sliding bearings and rolling bearings are popularly used in applications such as attaching a rotary axle to a machine frame, etc.

Common types of rolling bearings include ball bearings, roller bearings and needle bearings, in which rolling members such as balls, rollers, and needles are provided between an inner ring and an outer ring. The friction between the inner ring and the outer ring is known as "rolling friction," and is generally very small. Therefore, rolling bearings provide good high-speed operating capabilities. However, the roller members between the inner ring and the outer ring are prone to crack or deform under a heavy load. When this happens, the operating precision is dramatically decreased. In addition, the manufacturing costs of roller bearings are very high, especially roller bearings used in small devices such as computer fans.

Therefore, in small devices, sliding bearings are often used because of their relatively low manufacturing costs. A typical sliding bearing comprises an annular bearing sleeve having a circular bore, and a cylindrical shaft rotating in the bore. Most bearing sleeves used today are made of a copper-based alloy or stainless steel. The friction between the bearing sleeve and the shaft is known as "sliding friction," and is generally very large. To reduce the friction between the shaft and the bearing sleeve, a diameter of the bore of the bearing sleeve is configured slightly larger than a diameter of the shaft in order to provide an operating clearance, and an oil film is established in the operating clearance to act as a lubricant. Because of the operating clearance, the shaft is usually not located exactly along a central axis of the bearing sleeve. Instead, the shaft is displaced slightly from the central axis so that it rotates about an axis that is eccentric to the central axis. This leads to unsteady rotation of components mounted on the bearing sleeve. However, if the operating clearance is configured to have a reduced size, the lubricant therein may be forced out. When this happens, the bearing sleeve directly contacts the shaft, and the sliding bearing rapidly wears out. Therefore, sliding bearings usually have short lifetimes.

With the development of technology in fields where slide bearings are applied, modem slide bearings are being required to rotate at unprecedented high speeds. The problem of "sliding friction" is becoming commensurately more important. Traditional low abrasion, high hardness materials used for slide bearings are increasingly unable to provide satisfactory high-speed, long-life performance under harsh operating conditions. New materials for bearings are being eagerly sought. It has been found that certain ceramics have high compression strength, high friction resistance, and a small coefficient of friction. Ceramics are now widely considered to be a more serviceable material for slide bearings than traditional materials. Studies have shown that in ceramic slide bearings, it is feasible to reduce the contact area between the bearing sleeve and the shaft in order to reduce the friction therebetween, without diminishing the operating reliability of the slide bearing.

Taiwan Patent Publication No. 495118 discloses a sliding bearing made of ceramic material. In order to reduce the contact area between the bearing sleeve and the shaft, either an outer surface of the shaft or an inner surface of the bearing sleeve is configured to be non-cylindrical. When the bearing sleeve receives the shaft therein, at least a portion of the outer surface of the shaft does not contact the inner surface of the bearing sleeve, so that the contact area is reduced. However, the advantages of high compression strengthen and high abrasive resistance of the ceramic material also present novel problems in manufacturing the bearing sleeve, as detailed below.

Referring to FIG. 7, to attain a high degree of surface smoothness, a bore 4 of a bearing sleeve 1 needs to be ground with a grinding machine 2. The grinding machine 2 has a grinding bit 3 rotatingly machining the surface of the bearing sleeve 1 that defines the bore 4. During this process, the grinding bit 3 is subjected to a diametrical force by the bearing sleeve 1. This causes the grinding bit 3 to bend, especially when the grinding bit 3 is extended far into the bore 4. As a result, the ground bore 4 is irregular. That is, a diameter of the bore 4 nearest the grinding machine 2. One means of ameliorating this problem is to perform doubled-ended grinding. Referring to FIG. 8, two grinding machines 2 are provided to simultaneously grind the bore 4 at opposite ends thereof. Each grinding bit 3 has to penetrate only halfway into the bore 4. Accordingly, the grinding bits 3 are subjected to reduced diametrical forces, and the ground bore 4 is more uniform. However, it is generally not possible to completely eliminate irregularity of the bore 4. In addition, the two ground halves of the bore 4 may not be precisely coaxial, due to inherent manufacturing error.

SUMMARY OF THE INVENTION

Accordingly, an object of the present invention is to provide a ceramic bearing which can be easily produced.

To achieve the above-mentioned object, a ceramic bearing assembly in accordance with a preferred embodiment of the present invention comprises a shaft adapted for being mounted to a complementary supporting structure, and a bearing sleeve rotatably receiving the shaft. The bearing sleeve comprises an inside wall surrounding the shaft, and an outer surface adapted for being mounted to a rotatable body. A series of first bearing blocks is formed at the inside wall at a first end of the bearing sleeve, and a series of second bearing blocks is formed at the inside wall at a second end of the bearing sleeve. The first bearing blocks are arranged in circular fashion, and the second bearing blocks are arranged in circular fashion complementarily offset from the first bearing blocks. Each of the first and second bearing blocks defines a concave bearing surface, the bearing surfaces cooperatively supporting the shaft therebetween.

Other objects, advantages and novel features of the present invention will be drawn from the following detailed description of the preferred embodiment of the present invention with attached drawings, in which:

DESCRIPTION OF THE PREFERRED EMBODIMENT

Figure 1:
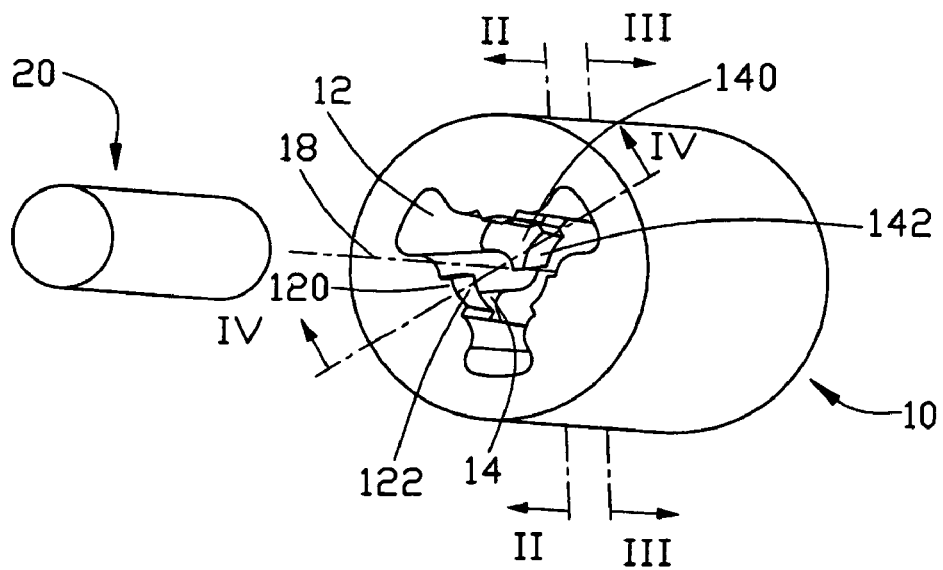
FIG. 1 is an exploded, isometric view of a ceramic bearing assembly in accordance with the preferred embodiment of the present invention, the ceramic bearing assembly comprising a bearing sleeve and a cylindrical shaft.

Referring to FIG. 1, a ceramic bearing assembly in accordance with the preferred embodiment of the present invention comprises a bearing sleeve 10 made of ceramic material, and a cylindrical shaft 20 fitted in the bearing sleeve 10. The shaft 20 is adapted to be mounted to a rotatable body (not shown).

The bearing sleeve 10 has a cylindrical outer surface. The outer surface is adapted for being mounted in a bore of a complementary supporting structure (not shown). A series of evenly spaced first grooves 12 and a series of evenly spaced second grooves 14 are defined in an inside wall of the bearing sleeve 10. The first and second grooves 12, 14 are each generally parallel to and equidistant from an axis of rotation 18 of the bearing sleeve 10. The first grooves 12 span from a first end of the bearing sleeve 10 toward a second end of the bearing sleeve 10. The first grooves 12 are slightly tapered, such that they are narrowest at inmost ends thereof and widest at the first end of the bearing sleeve 10. The second grooves 14 span from the second end of the bearing sleeve 10 toward the first end of the bearing sleeve 10. The second grooves 14 are slightly tapered, such that they are narrowest at inmost ends thereof and widest at the second end of the bearing sleeve 10. The first and second grooves 12, 14 are disposed adjacent each other in alternate fashion in a center portion of the bearing sleeve 10 between the first and second ends.

Figure 5:
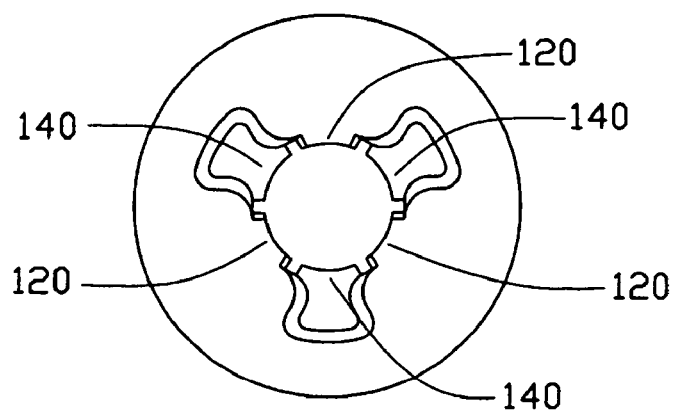
FIG. 5 is a left end elevation of the bearing sleeve of the ceramic bearing assembly of FIG. 1.

Referring also to FIG. 5, a series of evenly spaced first bearing blocks 120 is formed at the inside wall of the bearing sleeve 10 at the first end of the bearing sleeve 10. The first bearing blocks 120 extend from the first end of the bearing sleeve 10 to inmost ends of the second grooves 14 respectively. Thus the first bearing blocks 120 and the first grooves 12 are arranged at the first end of the bearing sleeve 10 in alternate fashion. Each first bearing block 120 is slightly tapered, such that it is widest at an inmost end thereof and narrowest at the first end of the bearing sleeve 10. Each first bearing block 120 defines a concave first bearing surface 122 thereon. A radius of curvature of the first bearing surface 122 corresponds to the axis 18 of the bearing sleeve 10. Said radius of curvature is substantially the same as a radius of the shaft 20. A series of evenly spaced second bearing blocks 140 is formed at the inside wall of the bearing sleeve 10 at the second end of the bearing sleeve 10. The second bearing blocks 140 extend from the second end of the bearing sleeve 10 to inmost ends of the first grooves 12 respectively. Thus the second bearing blocks 140 and the second grooves 14 are arranged at the second end of the bearing sleeve 10 in alternate fashion. Each second bearing block 140 is slightly tapered, such that it is widest at an inmost end thereof and narrowest at the second end of the bearing sleeve 10. Each second bearing block 140 defines a concave second bearing surface 142 thereon. A radius of curvature of the second bearing surface 142 corresponds to the axis 18 of the bearing sleeve 10, and is the same as the radius of curvature of the first bearing surface 122.

Figure 4:
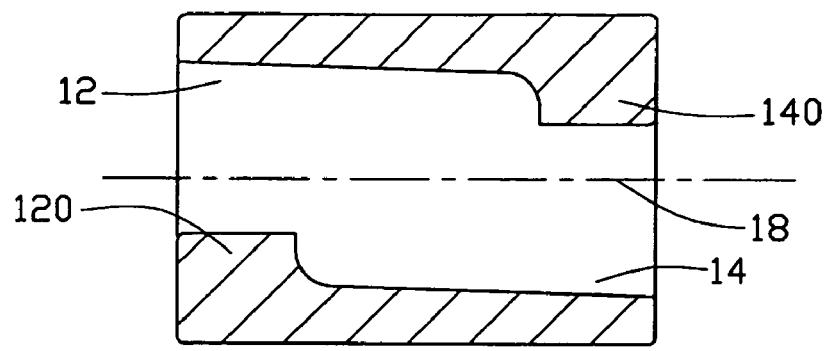
FIG. 4 is a schematic, cross-sectional view of the bearing sleeve of the ceramic bearing assembly of FIG. 1, corresponding to line IV-IV thereof.

Referring to FIG. 4, each first groove 12 has an open end at the first end of the bearing sleeve 10, and an opposite dead end at the corresponding second bearing block 140. Similarly, each second groove 14 has an open end at the second end of the bearing sleeve 10, and an opposite dead end at the corresponding first bearing block 120. It is noted that FIG. 4 shows only one first groove 12 and its corresponding second bearing block 140, and only one second groove 14 and its corresponding first bearing block 120. This construction of the bearing sleeve 10 is advantageously accomplished by injection molding, as described in detail below. However, it should be noted that the configuration of the bearing sleeve 10 may have other alternative forms, and that construction of the bearing sleeve 10 may be accomplished by means other than injection molding.

In the preferred embodiment of the present invention, there are three first grooves 12, three second grooves 14, three first bearing blocks 120 and three second bearing blocks 140. In alternative embodiments, other numbers of these components may be adopted according to need.

Figure 2:
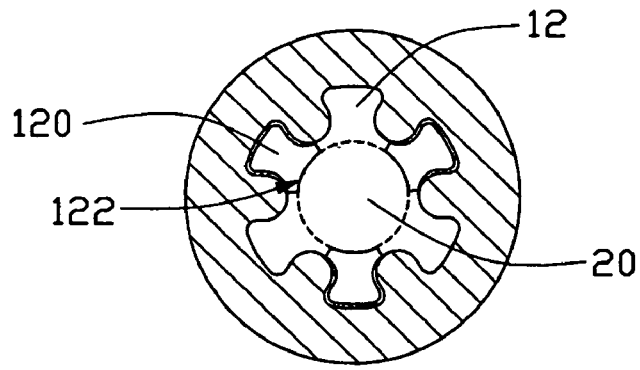
FIG. 2 is a schematic, cross-sectional view of the bearing sleeve of the ceramic bearing assembly of FIG. 1, corresponding to line II-II thereof.
Figure 3:
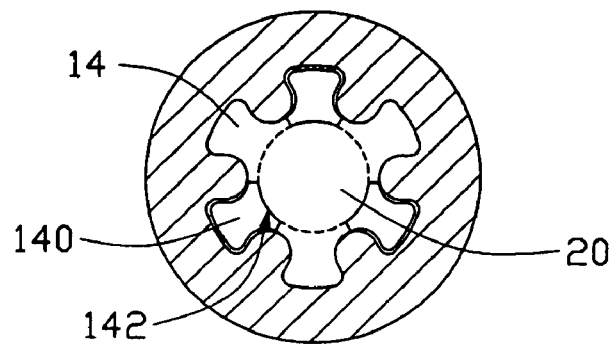
FIG. 3 is a schematic, cross-sectional view of the bearing sleeve of the ceramic bearing assembly of FIG. 1, corresponding to line III-III thereof.

In assembly, the shaft 20 is received in the bearing sleeve 10. Referring to FIGS. 2 and 3, a profile of the shaft 20 is shown in dashed lines. A first end of the shaft 20 is surrounded and supported by the first bearing surfaces 122 of the first bearing blocks 120, and an opposite second end of the shaft 20 is surrounded and supported by the second bearing surfaces 142 of the second bearing blocks 140.

Figure 6:
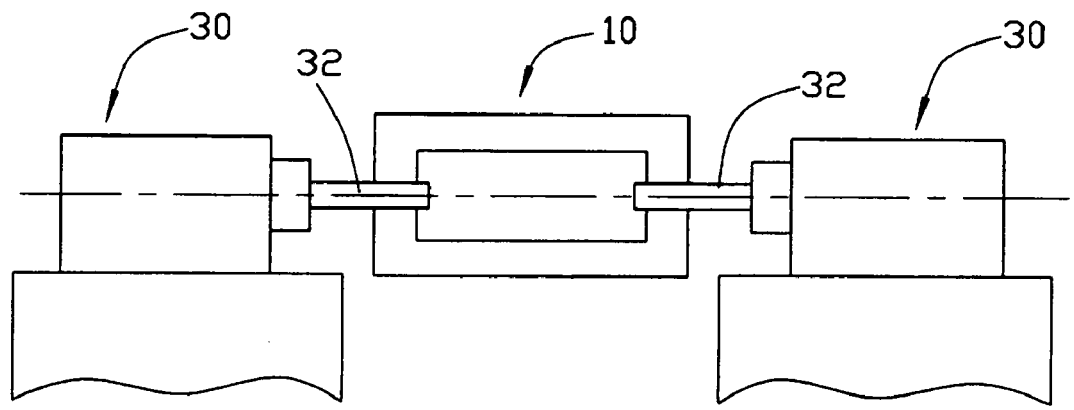
FIG. 6 is a schematic side elevation of two grinding machines grinding an inside wall of the bearing sleeve of the ceramic bearing assembly of FIG. 1.
Figure 7:
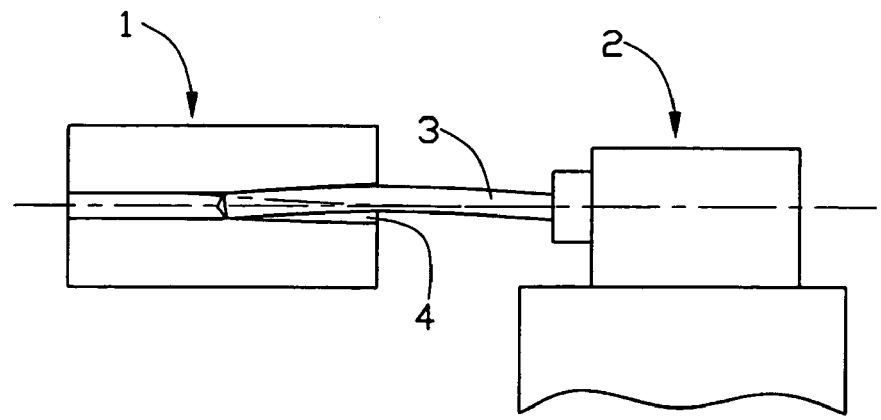
FIGS. 7 and 8 are schematic side elevations of respective grinding machines grinding an inside wall of a conventional bearing sleeve.
Figure 8:
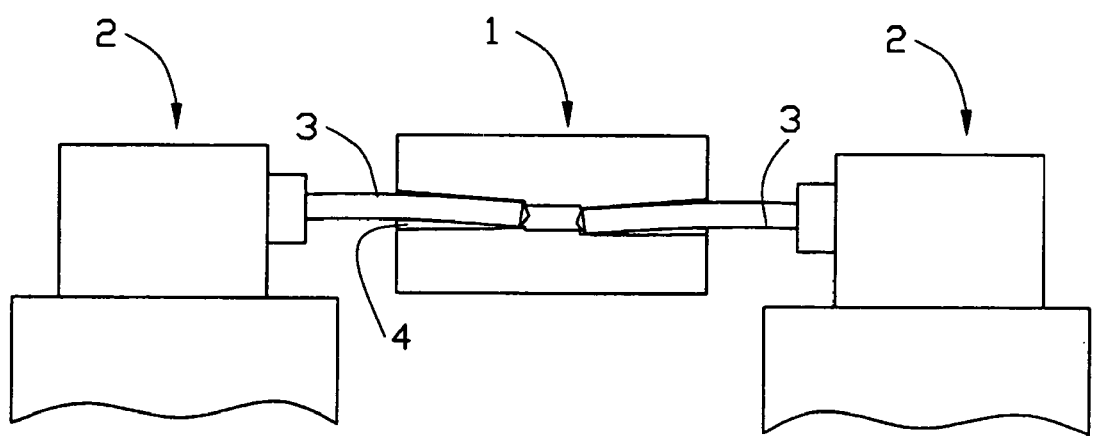

Generally, the bearing sleeve 10 is produced by three steps. First, a ceramic greenbody is formed, by injection molding a composite comprising ceramic powder dispersed within a thermoplastic polymer. Second, the polymer is burned out, and the resulting porous greenbody is sintered to a dense ceramic body having a same shape. Third and finally, referring to FIG. 6, grinding machines 30 are used to grind the first and second bearing surfaces 122, 142 until a high degree of surface smoothness is obtained. Preferably, the first and second bearing surfaces 122, 142 are ground at a same time by two respective grinding bits 32 of two grinding machines 30. This not only saves manufacturing time, but also reduces manufacturing error. This is because the bearing sleeve 10 only needs to be fixed on a work table a single time.

The grinding process only needs to be applied to the first and second bearing surfaces 122, 142 of the first and second bearing blocks 120, 140, with the first and second bearing blocks 120, 140 being located at the opposite first and second ends of the bearing sleeve 10. Therefore, when the first and second bearing surfaces 122, 142 are ground by the respective grinding bits 32 of the grinding machines 30, the grinding bits 32 do not have to penetrate very far into the bearing sleeve 10. Accordingly, the grinding bits 32 are subjected to reduced diametrical forces produced by the bearing sleeve 10, and the precision of manufacturing the bearing sleeve 10 is effectively increased. In addition, production of the bearing sleeve 10 is speedier and more efficient, because of the relatively small sizes of the first and second bearing surfaces 122, 142 that are ground.

In the preferred embodiment of the present invention, the whole of the bearing sleeve 10 is made of ceramic material. In an alternative embodiment, only portions of the bearing blocks 120, 140 at the first and second bearing surfaces 122, 142 are made of ceramic material.

It is understood that the invention may be embodied in other forms without departing from the spirit thereof. The above-described examples and embodiments are to be considered in all respects as illustrative and not restrictive, and the invention is not to be limited to the details given above.

The invention claimed is:

1. A bearing assembly, comprising:
   a shaft adapted for being mounted to a rotatable body; and
   a bearing sleeve rotatably receiving the shaft, the bearing sleeve comprising an inside wall surrounding the shaft, and an outer surface adapted for being mounted to a complementary supporting structure; wherein
   the bearing sleeve comprises a plurality of first bearing members formed at the inside wall at a first end thereof, and a plurality of second bearing members fanned at the inside wall at a second end thereof, the first bearing members being arranged in circular fashion, the second bearing members being arranged in circular fashion complementarily offset from the first bearing members, each of the first and second bearing members comprises a bearing surface and extending only partially along the entire length of the bearing sleeve, the bearing surfaces cooperatively supporting the shaft therebetween, wherein the bearing sleeve defines a plurality of first and second grooves in the inside wall thereof, and the first and second grooves are substantially parallel to a central axis of the bearing sleeve.

2. The bearing assembly as described in claim 1, wherein the first bearing members are spaced from each other at regular intervals, and the second bearing members are spaced from each other at regular intervals.

3. The bearing assembly as described in claim 2, wherein the first bearing members and the first grooves are arranged at the first end of the bearing sleeve in alternate fashion.

4. The bearing assembly as described in claim 3, wherein the first bearing members extend from the first end of the hearing sleeve to inmost ends of the second grooves respectively.

5. The bearing assembly as described in claim 2, wherein the second bearing members and the second grooves are arranged at the second end of the bearing sleeve in alternate fashion.

6. The bearing assembly as described in claim 5, wherein the second bearing members extend from the second end of the bearing sleeve to inmost ends of the first grooves respectively.

7. The bearing assembly as described in claim 1, wherein each of the bearing surfaces is concave, a radius of curvature of each of the bearing surface corresponds to the central axis of the bearing sleeve, and said radius of curvature is substantially the same as a radius of the shaft.

8. The bearing assembly as described in claim 1, wherein at least the bearing surfaces of the first and second bearing members are made of ceramic material.

9. The bearing assembly as described in claim 1, wherein each of the first and second grooves is slightly tapered from one of the first and second ends towards the other one of the first and second ends of the bearing sleeve.

10. The bearing assembly as described in claim 1, wherein each of the first grooves has an open end at the first end of the bearing sleeve and an opposite dead end at a corresponding second bearing member, and each of the second grooves has an open end at the second end of the bearing sleeve and an opposite dead end at a corresponding first bearing member.

11. The bearing assembly as described in claim 1, wherein the bearing surfaces of the first and second bearing members are discontinuous from each other.

12. A bearing assembly, comprising:
    a shaft adapted for being mounted to a rotatable body; and
    a bearing sleeve rotatably receiving the shaft, the bearing sleeve comprising an inside wall surrounding the shaft, and a plurality of bearing members provided at the inside wall to cooperatively support the shaft therebetween, the bearing members extending inwardly toward a central axis of the bearing sleeve; wherein
    each of the bearing members has a length less than a length of the bearing sleeve along said axis, and the bearing members are provided only at two opposite ends of the bearing sleeve as discrete islands isolated from each other.

13. The bearing assembly as described in claim 12, wherein the bearing members comprises a plurality of first bearing members located at a first end of the bearing sleeve, and a plurality of second bearing members located at an opposite second end of the bearing sleeve.

14. The bearing assembly as described in claim 13, wherein the first bearing members are arranged in circular fashion, and the second bearing members are arranged in circular fashion complementarily offset from the first bearing members.

15. The bearing assembly as described in claim 14, wherein said first bearing members and said second bearing members are essentially circumferentially alternately arranged with each other while at two different cross-sectional planes of said bearing sleeve.

16. The bearing assembly as described in claim 12, wherein each of the bearing members defines a concave bearing surface thereon, the bearing surfaces cooperatively surrounding and supporting the shaft therebetween.

17. The bearing assembly as described in claim 16, wherein at least the bearing surfaces of the bearing members are made of ceramic material.

18. The bearing assembly as described in claim 12, wherein the bearing members at one of the two opposite ends of the bearing sleeve are spaced from the bearing members at the other one of the two opposite ends of the bearing sleeve a distance along an axial direction of the bearing sleeve.

* * * * *